United States Patent Office 2,711,129
Patented June 21, 1955

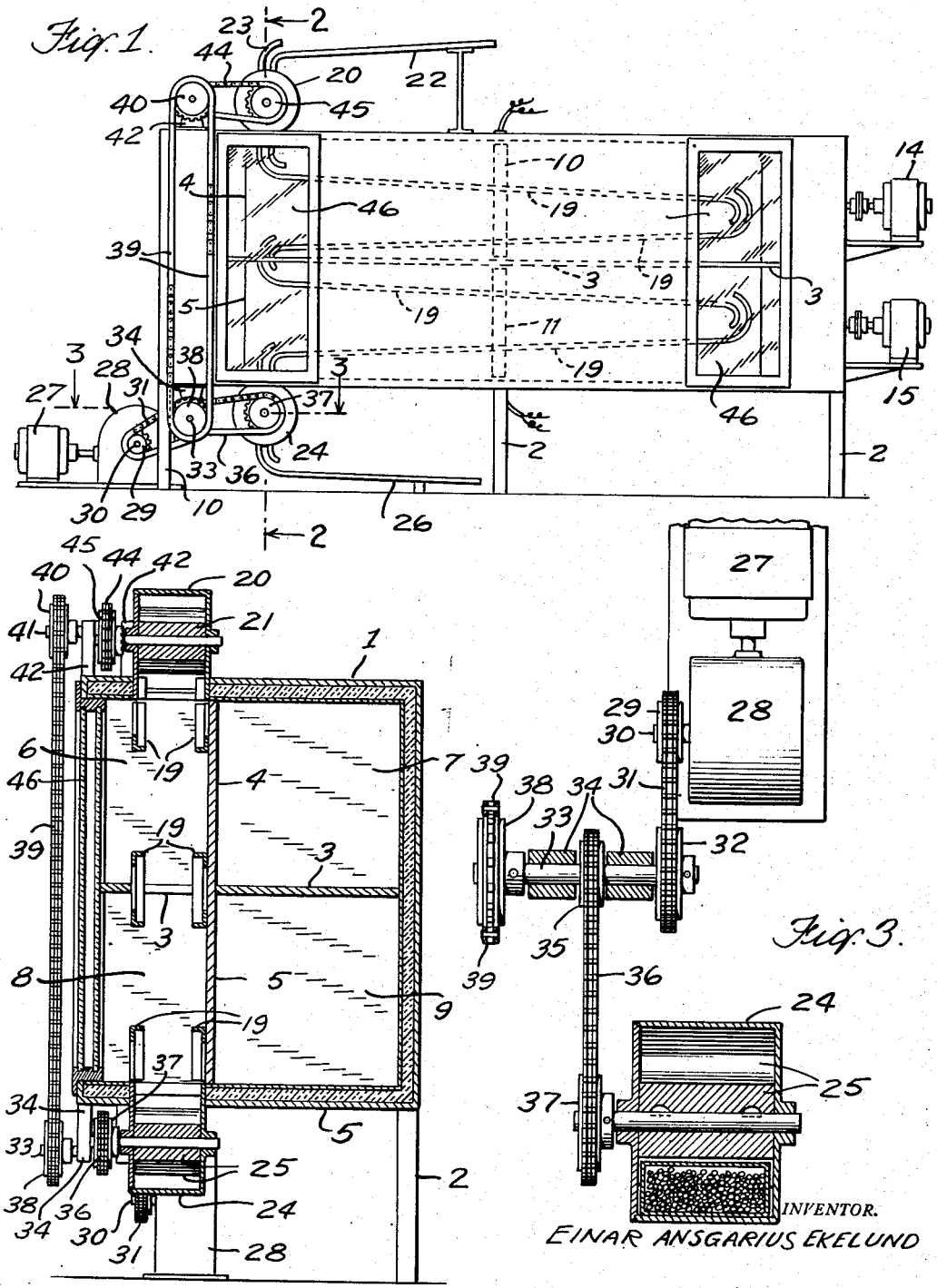

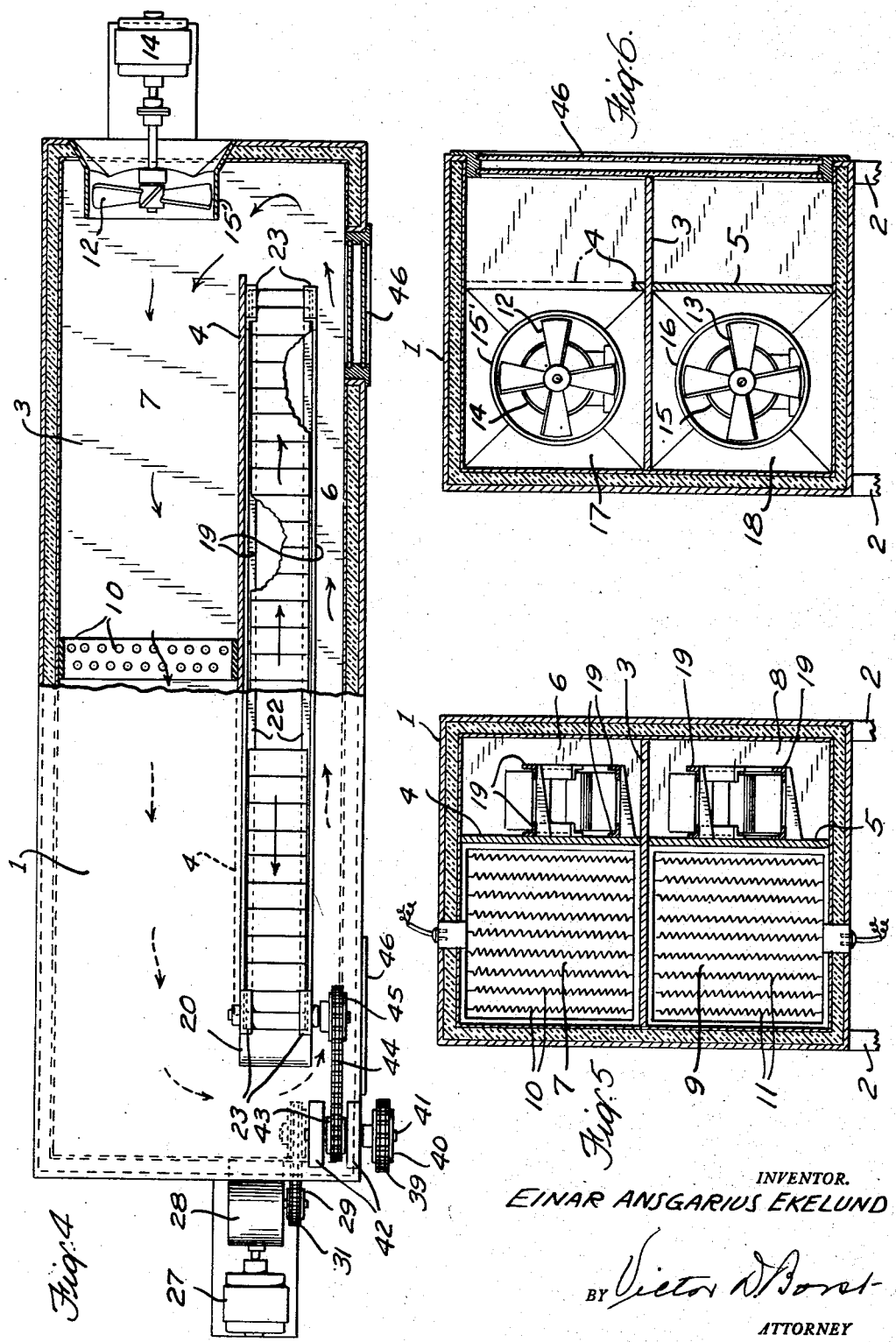

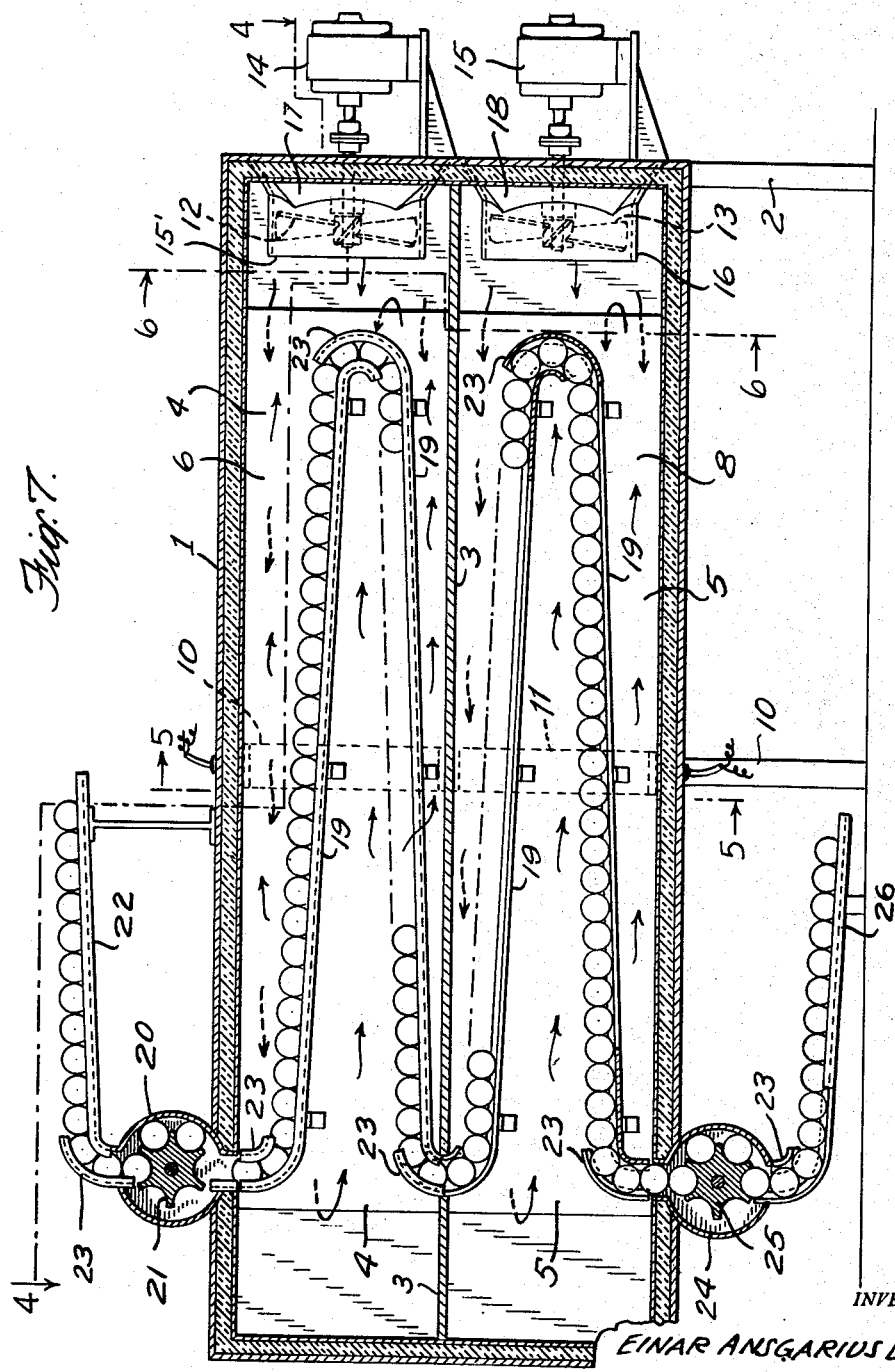

2,711,129

APPARATUS FOR STERILIZING FOODS

Einar Ansgarius Ekelund, Enebyberg, Sweden, assignor to Kooperativa Forbundet, Forening, u. p. a., Stockholm, Sweden Original application October 2, 1951, Serial No. 249,230, now Patent No. 2,701,205, dated February 1, 1955. Divided and this application December 19, 1952, Serial No. 326,978

1 Claim. (Cl. 99—364)

This application is a division of application Serial No. 249,230, filed October 2, 1951, issued as Patent No. 2,701,205, dated February 1, 1955, and relates to the apparatus for carrying out the method of that application.

In accordance with that method, foodstuffs, such as fruit, berries, vegetables, meat and fish, in hermetically sealed cans, are sterilized in chambers at atmospheric pressure in the presence of a dry, non-condensing gas, such as air, by causing a current of such gas heated above sterilizing temperature to pass over the cans at a controlled rate, thereby bringing the contents rapidly up to sterilizing temperature, and then holding the contents at that temperature until sterilization is effected by subjecting the cans to a current of such gas at a controlled rate and heated to sterilizing temperature.

As an apparatus for this purpose, the invention contemplates two suitably insulated contiguous chambers through which the cans are conveyed in succession with a separate heater disposed in each chamber and separated from the conveyor by a baffle or partition, and an impeller such as a fan to circulate the atmosphere, which will normally be air, over the heater and over the conveyor portion in that chamber.

The partition which serves as a baffle terminates short of the ends of the chamber and forms a circuit for the movement of the air in opposite directions on the two sides of the partition.

The two chambers are desirably separated only by a common partition which is provided with a passage through which the conveyor extends. Preferably though not necessarily the conveyor is in the form of an inclined chute which extends back and forth the desired number of times in each chamber and continues from one chamber to the next through the passage in the partition between the chambers, the slope of the chute being such that the cans will roll down the conveyor by gravity.

Feeding and discharging valve means for the cans at the beginning and end of the conveyor are operated in unison so that the cans enter and leave the sterilizer at the same rate. These valve means are acceptably in the form of toothed wheels and when it operation they serve to keep the admission and discharge openings sealed.

For a more complete understanding of the invention reference is made to the embodiment represented in the accompanying drawings in which:

Fig. 1 is a side elevation of a sterilizer embodying the invention;

Fig. 2 is an enlarged transverse sectional elevation on the plane of line 2—2 of Fig. 1;

Fig. 3 is an enlarged detail sectional plan on the plane of line 3—3 of Fig. 1;

Fig. 4 is a partial plan and partial horizontal section of the sterilizer on a larger scale, as indicated by the broken line 4—4 of Fig. 7;

Fig. 5 is a transverse sectional elevation on the plane indicated by the line 5—5 of Fig. 7;

Fig. 6 is a transverse sectional elevation on the plane indicated by the line 6—6 of Fig. 7; and Fig. 7 is an enlarged longitudinal section through the plane of the conveyor.

The illustrated sterilizer has a double walled oblong casing or housing 1 supported on legs 2, the space between the walls being filled with heat insulating material, such as glass wool. For further insulation the casing may be sheathed with fibrous boards or teakwood.

This insulated casing is divided into an upper and lower chamber of equal dimensions by a horizontal partition 3 and except for the end portions these chambers are divided into two lateral compartments or tunnel portions by the vertical longitudinal partitions 4 and 5, respectively. These vertical partitions are disposed off center and form a narrow passage or tunnel 6 and wide passage or tunnel 7 in the upper chamber and a narrow passage or tunnel 8 and wide passage or tunnel 9 in the lower chamber. The vertical partitions terminate short of the casing at each end so as to provide communication between the two passages or tunnels in each chamber at both ends of the casing.

An electrical heating element 10 is disposed across the passage 7 in the upper chamber substantially at the middle of the passage and a similar heating element 11 is similarly disposed in the corresponding passage 9 in the lower chamber. To induce a forced circulation of the air or other gas in the chambers, fans 12 and 13 at one end of the passages, 7 and 9, respectively, are provided, operatively connected to motors 14 and 15, respectively. The fans are shown as disposed in circular ducts $15^1$ and 16, respectively, which closely surround the fan blades and constitute inward extensions of pyramidal closures 17 and 18, respectively, for the ends of the passages 7 and 9, respectively. The opposite ends of the passages 7 and 9 and both ends of the passages 6 and 8 are closed by the casing wall. There is thus formed in each chamber a closed circuit for the travel of the gas through the two passages or tunnels.

The conveyor for the cans is disposed in the narrower passages 6 and 8. Instead of a traveling conveyor, which of course might be used, inclined chutes 19 are shown, there being two reversely directed sections in each chamber. Cans are admitted to the upper chute section through an opening in the top of the casing from a cylindrical hopper or feed chamber 20 by means of a rotative toothed wheel 21 to which cans are directed from a feed chute 22. Curved guides 23 at the ends of the chute sections direct the cans as they leave a section. From the return section 19 in the upper chamber the cans pass down through an opening in the horizontal partition 3 on to the first section in the lower chamber.

From the second or return section 19 in the lower chamber, the cans pass down through an opening in the bottom of the casing into a cylindrical receiving chamber 24 in which a toothed delivery wheel 25, in all respects similar to the wheel 21, is driven in synchronism with the wheel 21. This wheel 25 delivers the treated cans on to an exit chute section 26.

The inclination of the chute sections is such that the cans roll through the chambers by gravity, moving along as fast as the delivery wheel 25 is turned and removes the leading cans.

The feed and delivery wheels 21 and 25 are connected to be driven in unison by a motor 27. This motor is shown as disposed on the floor level and through reduction gearing in gear box 28 drives sprocket 29 on shaft 30. Chain 31 connects sprocket 29 with sprocket 32 on transverse stub shaft 33 which turns in bearings 34 supported by brackets on the under side of the casing. A sprocket 35 on the shaft 33 between the bearings 34 is connected by chain 36 to sprocket 37 on the shaft of delivery wheel 25.

A drive is also provided from the shaft 33 to the feed wheel 21 through sprocket 38 on the outer end of stub shaft 33, vertical chain 39, sprocket 40 on the outer end of shaft 41 which bears in brackets 42 on the top of the casing, sprocket (not shown) on the inner end of shaft 41, chain 44 and sprocket 45 on the shaft of feed wheel 21.

The casing is shown as provided with two windows 46 to enable inspection of the interior during operation. The can feeding and conveying parts will be made replaceable so as to accommodate different size cans.

As indicated in Fig. 3, it is assumed, for example, that cans of peas are being treated. For better illustration the apparatus is shown empty in Figs. 1 and 2, but the disposition of cans during operation is shown in Figs. 4 and 7. The incoming cans are placed on the feed chute 22 and the toothed wheels which serve as feed and delivery valves are rotated in synchronism at the proper speed to keep the moving cans in the treating chambers the correct length of time. The rotation of the cans as they travel through the sterilizer agitates the peas and causes even treatment through the contents.

In operation the fans circulate the air at atmospheric pressure in their respective chambers over the heaters and over the cans, the temperature being above sterilization temperature in the upper chamber and substantially at sterilization temperature in the lower chamber. The speed at which the air is circulated through the chamber is definitely controlled as is the rate of movement of the cans through the apparatus and the temperatures of the atmosphere in the two chambers.

It will be understood by those skilled in the art that details of construction illustrated in the drawings and above particularly described may be changed without departing from the principles and scope of the invention as defined in the following claim.

What is claimed is:

An apparatus for sterilizing food in cans comprising a housing having a plurality of superposed chambers with common partition means between adjacent chambers, a vertical partition in each chamber terminating short of the end walls of the chamber and dividing the chamber into two laterally disposed passages communicating at their ends, the housing having an inlet opening for cans in the top of the uppermost chamber and a discharge opening in the bottom of the lowermost chamber and a communicating opening through the partition means between adjacent chambers, a continuous conveyor connecting the inlet and discharge openings and disposed to receive cans on their sides and convey them back and forth through one passage in each chamber and through the communicating opening in each partition means between adjacent chambers, a horizontally directed circular duct in a corresponding end wall of each chamber and leading into the other passage in the chamber, a rotative fan disposed in each of said ducts, separate power means for the fans, and a heater in said other passage of each chamber.

References Cited in the file of this patent

UNITED STATES PATENTS

| | | |
|---|---|---|
| 498,358 | Merrill | May 30, 1893 |
| 812,154 | Scott | Feb. 6, 1906 |
| 2,549,216 | Martin | Apr. 17, 1951 |
| 2,607,698 | Martin | Aug. 19, 1951 |

FOREIGN PATENTS

| | | |
|---|---|---|
| 65,038 | Austria | 1914 |
| 448,270 | Great Britain | 1936 |
| 535,674 | France | 1922 |